United States Patent [19]

Araki et al.

[11] Patent Number: 5,463,553
[45] Date of Patent: Oct. 31, 1995

[54] NAVIGATION APPARATUS AND NAVIGATION METHOD

[75] Inventors: Morio Araki; Katsuyoshi Hayashi; Yukiko Habu, all of Kawagoe, Japan

[73] Assignee: Pioneer Electronic Corporation, Tokyo, Japan

[21] Appl. No.: 260,833

[22] Filed: Jun. 16, 1994

[30] Foreign Application Priority Data

Jun. 18, 1993 [JP] Japan .................................. 5-148102

[51] Int. Cl.$^6$ .................................................. G06F 17/00
[52] U.S. Cl. ........................ 364/444; 364/449; 340/990; 340/995
[58] Field of Search ................................. 364/443, 444, 364/449; 73/178 R; 340/990, 995

[56] References Cited

U.S. PATENT DOCUMENTS

| | | | |
|---|---|---|---|
| 5,270,936 | 12/1993 | Fukushima et al. | 364/444 |
| 5,274,387 | 12/1993 | Kakihara et al. | 342/451 |
| 5,293,163 | 3/1994 | Kakihara et al. | 340/995 |
| 5,323,321 | 6/1994 | Smith, Jr. | 364/449 |
| 5,345,388 | 9/1994 | Kashiwazaki | 364/449 |
| 5,363,306 | 11/1994 | Kuwahara et al. | 364/449 |
| 5,365,449 | 11/1994 | Kashiwazaki | 364/449 |

FOREIGN PATENT DOCUMENTS 5-181413 7/1993 Japan .
2102259 1/1983 United Kingdom .

*Primary Examiner*—Kevin J. Teska
*Assistant Examiner*—Susan Wieland
*Attorney, Agent, or Firm*—Young & Thompson

[57] ABSTRACT

A navigation apparatus is provided with: a measuring device for measuring a present position of a movable body to output a present position information; a storing device for storing map information; a displaying device having a display picture plane, for displaying various information on the display picture plane; a display controlling device for controlling the displaying device to display a target position information, which is set as information indicating a target position, and the present position information on the map information; a judging device for judging whether a distance between the present position and the target position is within a predetermined value; and a calculating device for calculating a middle position between the present position and the target position when the distance is within the predetermined value, to output middle position information, the display controlling device controlling the displaying device to display the target position information and the present position information under a condition where a display position of the middle position information is located at a center of the display picture plane.

6 Claims, 5 Drawing Sheets

|PA| = |QA|

NAVIGATION APPARATUS AND NAVIGATION METHOD

BACKGROUND OF THE INVENTION

1. Field of the Invention

The present invention generally relates to a navigation apparatus and a navigation method for a movable body, and more particularly to a navigation apparatus and a navigation method for a vehicle, which can display information related to a target position and a present position.

2. Description of the Related Art

There are navigation apparatus of so called self sustaining type (i.e. built in type) and navigation apparatus of GPS (Global Positioning System) type using artificial satellites. The navigation apparatus of self sustaining type is an apparatus for obtaining two dimensional displacement data of the present position of the movable body by earth magnetism data from an earth magnetism sensor, an azimuth data from an angular velocity sensor and a travelling distance data from a travelling distance sensor, and for integrating this two dimensional displacement data with respect to a standard point so as to measure a new present position of the movable body. The navigation apparatus of GPS type is an apparatus for receiving electric waves from more than two GPS satellites by a GPS receiver, and for calculating the present position of the movable body at the receiving point by pseudo distance data, which includes the time offset of the receiver between each GPS satellite and the receiving point, and positional data of each GPS satellite.

In the image display related to the navigation apparatus of a vehicle etc., a present position of the movable body, which indicates a travelling position of the movable body obtained by the above mentioned various position measurement data, and a target position, which indicates a target place set by an operator beforehand, are displayed on a map. Especially, when the travelling position of the movable body approaches the target place, both of the above mentioned movable body position and the target position are simultaneously displayed on one display picture plane.

In the above explained case, when the movable body position and the target position are displayed on one picture plane, an image display is performed as shown in FIG. 4A–4B.

In FIG. 4A, a position P, which indicates a movable body position, a position Q, which indicates a target position, and a position A, which is a center position of the display image, are indicated on the display picture plane. Dref is a distance of a reference radius expressed by dots (i.e. picture elements). Since the image on the display picture plane is formed by the set of dots, the dot can be used as a unit replacing the distance on the display picture plane. In FIG. 4A, the display picture plane is shown in the case where the movable body approaches the target place, and both of the movable body position P and the target position Q come into the display picture plane G.

In this manner, when both of the movable body position P and the target position Q, exist on the same display picture plane, the center position A of the display picture plane is set such that the area in front of the advancing direction of the movable body, is displayed more in area than the area at the back thereof. Namely, so called front wide concept is employed in this case. This is accomplished by setting the display coordinates of the map information to get such a relationship that the display position of the movable body position P is always on the circumference of a circle having the radius equal to the distance Dref around the center position A.

However, in the above mentioned navigation apparatus, when the distance between the movable body position P and the target position Q becomes less than the distance Dref as the movable body approaches the target place, the display positions of the movable body position P and the target position Q on the image display, are shifted from the center position of the display picture plane, so that the balance on the sight becomes bad as shown in FIG. 4B, which is the problem.

The cause of this problem is that the movable body position P on the display is always separated from the center position by the distance Dref according to the above mentioned condition, even if the movable body position P approaches the target position Q as close as possible. Namely, as the movable body approaches the target position, the display position of the movable body position P is not moved on the sight, instead, it is recognized on the sight that the target position Q approaches the movable body position P and that those two displays are finally collected at the position apart form the center position by the distance Dref.

On the other hand, there is another problem as following. Namely, the display position is frequently moved due to the measurement accuracy and error. Especially, at the vicinity of the target position Q, even under the condition that the movable body position P should still be displayed on the display, since the movable body is actually stopped, the movable body position P frequently moves (i.e. blurring) around the target position Q each time when this movement due to the measurement accuracy and error occurs. Consequently, the positional relationship between the movable body position P and the target position Q is difficult to be specified. This phenomenon is especially outstanding in case of the GPS measurement, when one GPS satellite, which has been used, is exchanged to another GPS satellite, since one GPS satellite cannot be used due to the degradation in the receiving condition.

FIG. 5, shows an example of such a blur caused by the measuring error of the GPS. In FIG. 5, the phenomenon is explained in which the navigation apparatus exchanges the reception of the electric wave from the GPS satellite and performs the measurement under the condition that the movable body is still. If the measurement is performed by exchanging the satellites between S1 to S4 among a plurality of GPS satellites which are the objects of signal reception and which conditions of signal reception are changed, the measurement result is changed each time the GPS satellite is exchanged. Accordingly, if this result is reflected to the image display, the display positions of the movable body and the target are not settled but blurred as indicated by P1 to P4, and Q1 to Q4 in FIG. 5.

In this manner, when the blurring phenomenon occurs due to the measurement error, the target position as well as the present position is difficult to recognize on the display picture plane of the display device.

SUMMARY OF THE INVENTION

It is therefore an object of the present invention to provide a navigation apparatus and a navigation method, by which the display positions of the movable body position and the target position can be easily recognized on the display, while reducing the influence of the above mentioned blurring phenomenon of the present position.

The above object of the present invention can be achieved by a navigation apparatus provided with: a measuring device for measuring a present position of a movable body to output a present position information indicating the measured present position; a storing device for storing map information; a displaying device having a display picture plane, for displaying various information on the display picture plane; a display controlling device for controlling the displaying device to display a target position information, which is set as information indicating a target position, and the present position information on the map information; a judging device for judging whether or not a distance between the present position and the target position is within a predetermined value; and a calculating device for calculating a middle position between the present position and the target position when the distance is within the predetermined value according to a judgement by the judging device, to output middle position information indicating the calculated middle position. The display controlling device controls the displaying device to display the target position information and the present position information under a condition where a display position of the middle position information is located at a center of the display picture plane.

According to the navigation apparatus of the present invention, when the present position information, which indicates the present position of the movable body, approaches the target position information, which indicates the target place, within a predetermined distance on the map, the calculating device calculates the middle position between the present position and the target position from the information of those two positions.

Next, the display controlling device controls the displaying device by use of this calculated middle position information as the input parameter, to display the present position information, the target position information, and the map information such that the coordinates of this calculated middle position is located at the center of the display picture plane.

Consequently, the display positions of the present position and the target position are not shifted from the center of the display picture plane of the display device, even when the movable body approaches the target position and is positioned in the vicinity of the target place. Thus, even if the measurement accuracy is degraded because of the exchange of the GPS satellites etc., the present position of the movable body is not blurred on the display so much, according to the navigation apparatus of the present invention.

The above object of the present invention can be also achieved by a navigation method provided with the steps of: measuring a present position of a movable body to output a present position information indicating the measured present position; storing map information; displaying various information on a display picture plane of a displaying device; controlling the displaying device to display a target position information, which is set as information indicating a target position, and the present position information on the map information; Judging whether or not a distance between the present position and the target position is within a predetermined value; calculating a middle position between the present position and the target position when the distance is judged to be within the predetermined value, to output middle position information indicating the calculated middle position; and controlling the displaying device to display the target position information and the present position information under a condition where a display position of the middle position information is located at a center of the display picture plane.

Consequently, the display positions of the present position and the target position are not shifted from the center of the display picture plane, even when the movable body approaches the target position. Thus, even if the measurement accuracy is degraded, the present position of the movable body is not blurred on the display so much, according to the navigation method of the present invention.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

Figure 1:
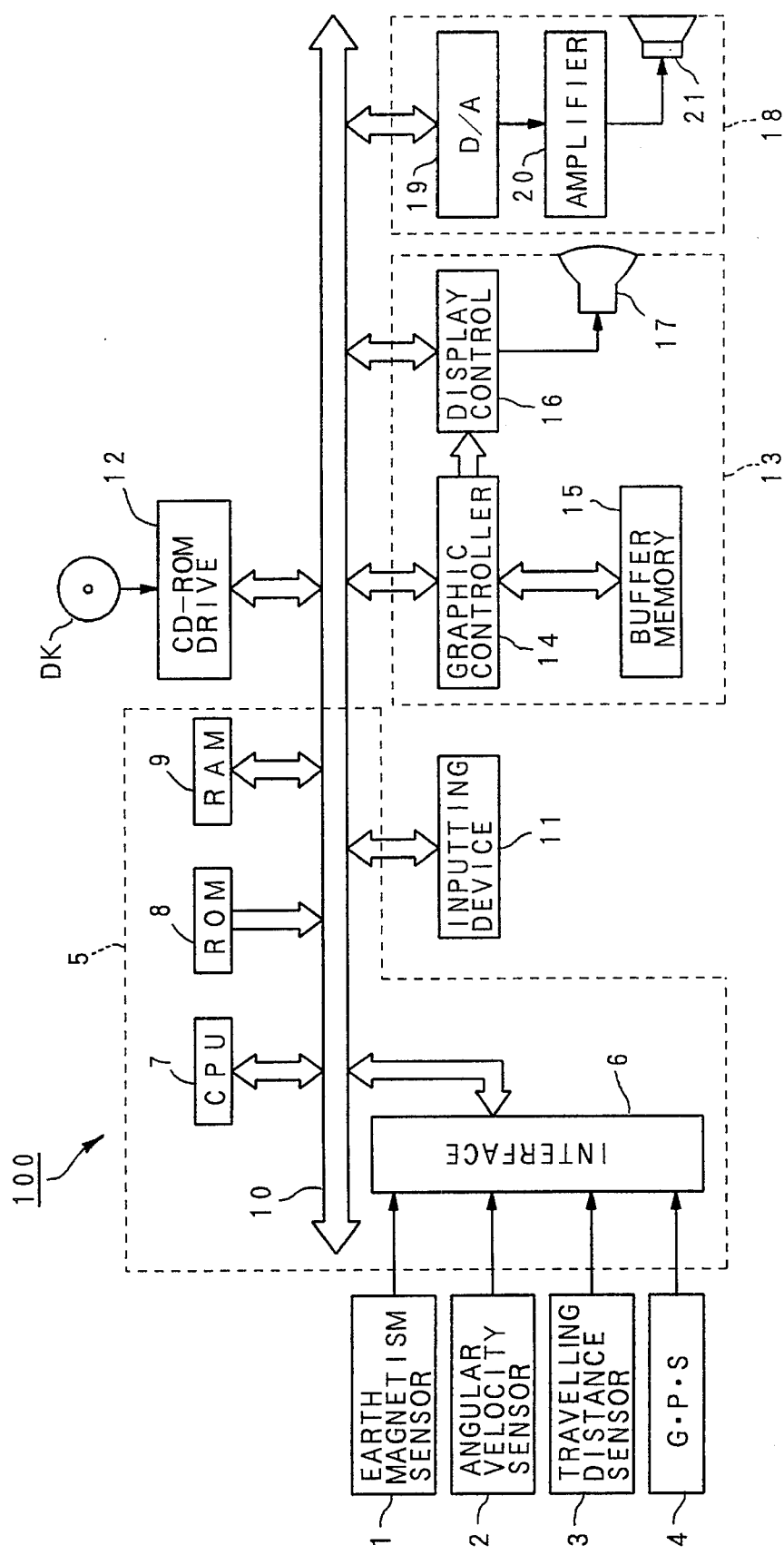
FIG. 1 is a block diagram showing a navigation apparatus of an embodiment according to the present invention.

FIG. 1 is a block diagram showing a basic construction of an on-vehicle navigation apparatus as one embodiment of the present invention.

In FIG. 1, an on-vehicle navigation apparatus 100 is provided with: an earth magnetism sensor 1 for outputting an azimuth data in an advancing direction of a movable body; an angular speed sensor 2 for detecting an angular velocity at the time when the movable body rotates, and for outputting an angular velocity data; a travelling distance sensor 3 for detecting and for integrating a rotation number of a shaft of the movable body, and outputting a travelling distance data; a GPS receiver 4 for receiving electric waves from GPS satellites, and for outputting GPS measurement data; a system controller 5 for controlling the overall navigation apparatus, on the basis of the azimuth data, the angular velocity data, the travelling distance data and the GPS measurement data; an inputting device 11 for inputting various data to the navigation apparatus; a CD-ROM (Compact Disk—Read Only Memory) drive 12 for reading and for outputting various data from a CD-ROM disk DK under the control of the system controller 5; a display unit 13 for displaying various display data under the control of the system controller 5; and an audio reproducing unit 18 for reproducing and for outputting various audio data under the control of the system controller 5.

The system controller 5 is provided with: an interface unit 6 for performing an interface operation with the external; a CPU (Central Processor Unit) 7 for controlling the whole system controller; a ROM (Read Only Memory) 8 for storing a control program to control the system controller 5; and a RAM (Random Access Memory) 9 having a nonvolatile memory portion, for storing various data in a writable manner. The inputting device 11, the CD-ROM drive 12, the displaying unit 13 and the audio reproducing unit 18 are connected to each other through a bus line 10.

The display unit 13 is provided with: a graphic controller 14 for performing the overall control of the display unit 13, on the basis of the control data transmitted from the CPU 7 through the bus line 10; a buffer memory 15 consisting of a memory such as a VRAM (Video RAM), for temporarily storing image information in a form to be immediately displayed; a display controlling portion 16 for controlling the display of a display device 17 such as a LCD (Liquid Crystal Display) device, a CRT (Cathode Ray Tube), on the basis of the image data outputted from the graphic controller 14.

The audio reproducing unit 18 is provided with: a D/A (Digital to Analog) convertor 19 for performing a digital to analog conversion of the audio digital data transmitted from the CD-ROM drive 12 or the RAM 9 through the bus line 10; an amplifier 20 for amplifying the audio analog signal outputted from the D/A convertor 19; and a speaker 21 for converting the amplified audio analog signal to the audio vibration and outputting it.

Figure 2:
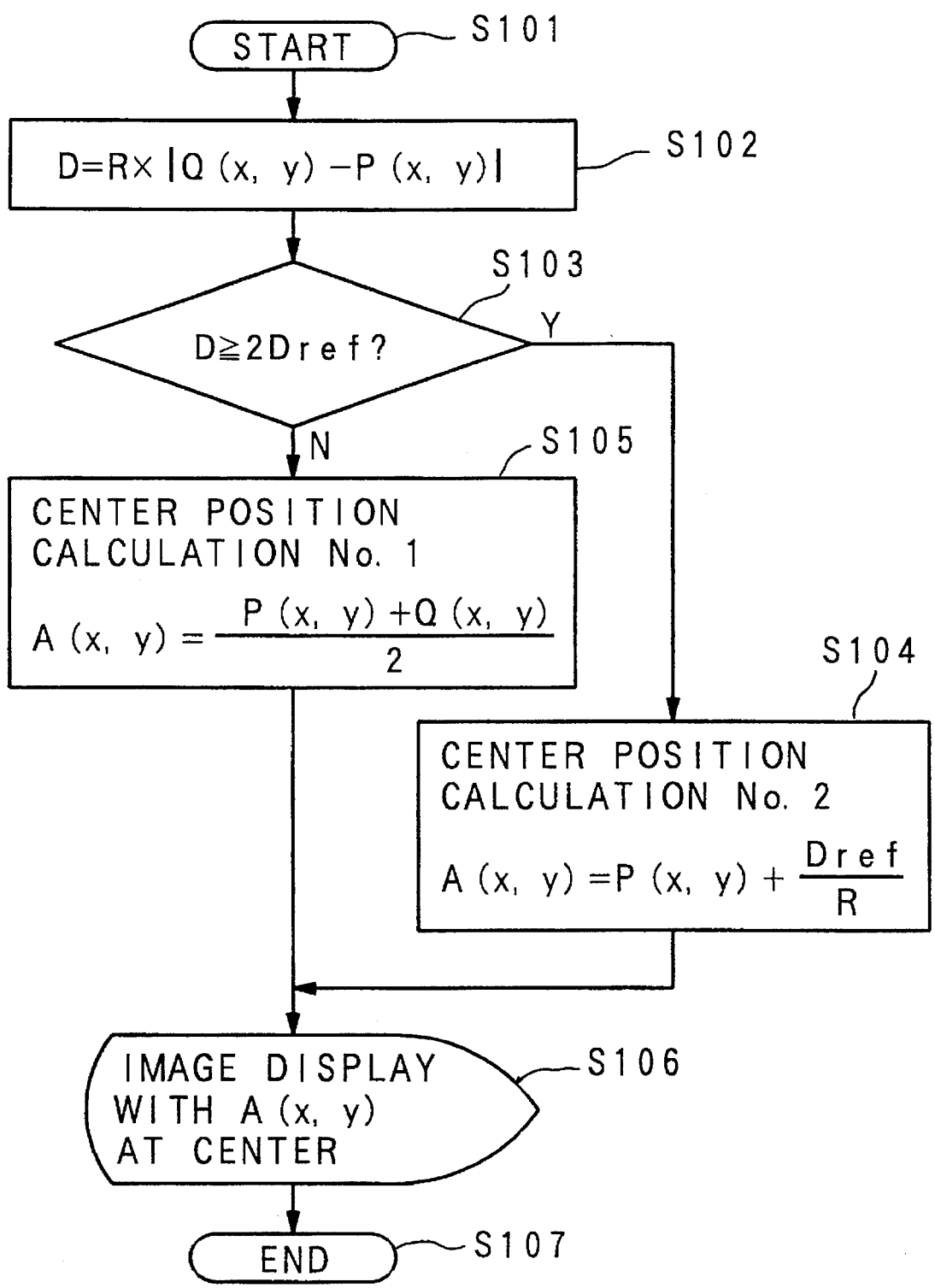
FIG. 2 is a flow chart of an operation for setting a center position in the embodiment.

Next, an operation of the present embodiment will be explained on the basis of a flow chart of FIG. 2.

This flow chart shows a control operation to display an image, which is called and performed as a sub-routine to set the display center position of the display picture plane, in various control operations performed in the navigation.

In the arithmetic expressions in the flow chart, $P(x,y)$ represents a coordinate of the movable body position, $Q(x,y)$ represents a coordinate of the target position, and $A(x,y)$ represents a coordinate of the center position to be obtained. Here, x is an amount corresponding to the longitude, and y is an amount corresponding to the latitude. A plane map used in the navigation apparatus is a map obtained by developing an earth having a spherical shape to a flat plane by use of an appropriate rule. Therefore, the actual longitude and latitude, do not coincide with the coordinate system on the developed map in a strict sense, so that they are not proper to use in the calculation of the coordinates, as they are. Therefore, as a coordinate system corresponding to the longitude and latitude, x and y are used. Further, a concept of distance used here, is not a value expressed by a unit such as km (kilometer) itself, which is an actual scaler amount.

Now, as an initial condition, the CPU 7 receives the various measurement data from the earth magnetism sensor 1, the angular velocity sensor 2, the travelling distance sensor 3 and the GPS 4, through the interface unit 6 and the bus line 10 as shown in FIG. 1, according to the control program stored in the ROM 8, and applies various corrections with respect to the received data. Then, the CPU 7 stores the data to the RAM 9 as the movable body position coordinate $P(x,y)$.

The user operates the inputting device 11, and the CPU 7 outputs the control signal to the CD-ROM drive 12 in response to the information inputted by the inputting device 11. The CPU 7 transmits the corresponding map information from the CD-ROM disk DK to the graphic controller 14. This transmitted map information is stored in the buffer memory 15, and, at the same time, is displayed on the display device 17, as the map image through the display controlling unit 16. Then, the user specifies the target position on the map image by the inputting device 11, which correspond to the target place. This information of the target position is stored in the RAM 9 as the target position coordinate $Q(x,y)$.

Next, when the movement of the movable body is actually started, and the navigation apparatus is set in a state to perform an ordinary display of a movable body position and its related map information, and perform a special operation to give a central coordinate of the map information, which should be displayed, to the graphic controller 14, in order to display the target position display.

First, the CPU 7 requests this control operation to perform the central coordinate setting of the image display (step S101). Then, the distance between the movable body position and the target position is calculated from the movable body position coordinate $P(x,y)$ and the target position coordinate $Q(x,y)$ which are the information stored in the RAM 9 (step S102). In the step S102, the distance expressed by the following expression (1) is the distance between those two positions.

$$|Q(x,y)-P(x,y)| \qquad (1)$$

In the dot distance calculation in the step S102, R represents a conversion ratio for converting the distance in the x, y coordinate system to the distance D expressed by the dot number on the map information. The conversion ratio R is set to be an appropriate vale depending on the scale of the map information to be used.

From this dot distance calculation of the step S102, it can be recognized how many dots the movable body position coordinate $P(x,y)$ and the target position coordinate $Q(x,y)$ are separated by, on the display picture plane.

Therefore, the calculation result i.e. the obtained distance D of the step S102 and the distance 2 Dref, which is twice of the reference radius set beforehand (namely the diameter), are compared with each other (step S103). The meaning of this process is to judge whether the position Q is within the area prescribed by the radius of the distance Dref with respect to the position P, indicated by a chain line in FIG. 4. The value of the distance Dref is set to be a value of 15 to 40 dots, in case that the display picture plane is displayed by a matrix of 288 dots×216 dots, for example.

In case that $D \leq 2$ Dref (Yes in the step S103)

Figure 4A:
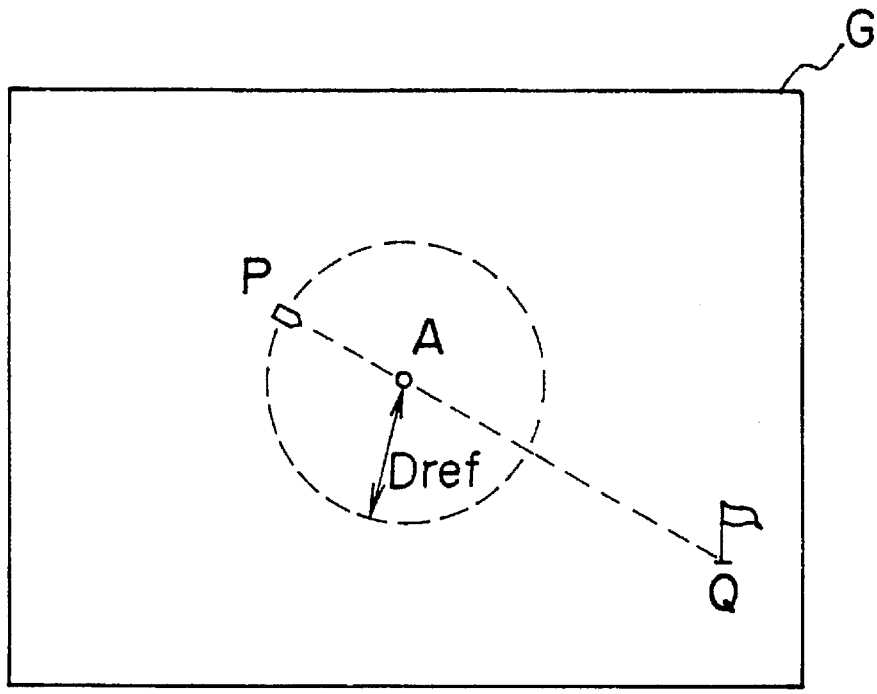
FIG. 4 is a diagram for explaining a relationship between a movable body position and a target position on an image display in the related art.

This case corresponds to the positional relationship between the position P and the position Q shown in FIG. 4A. Since the distance between the position P and the position Q are separated from each other by a sufficient distance yet, the center position coordinate $A(x,y)$ (i.e. position A) is obtained by the center position calculation No. 2 in the step S104. In this expression of the calculation No. 2, the term $$Dreff/R \qquad (2)$$

is to revert the distance expressed by the dot number to the x, y coordinate system. Thus, by the center position calculation No. 2 in the step S104, the movable body position P is set to a position which is always apart from the center position A by a distance Dref ( as shown in FIG. 4A ). This calculated information is stored to the RAM 9.

In case that $D < 2$ Dref (No in the step S103 )

Figure 3:
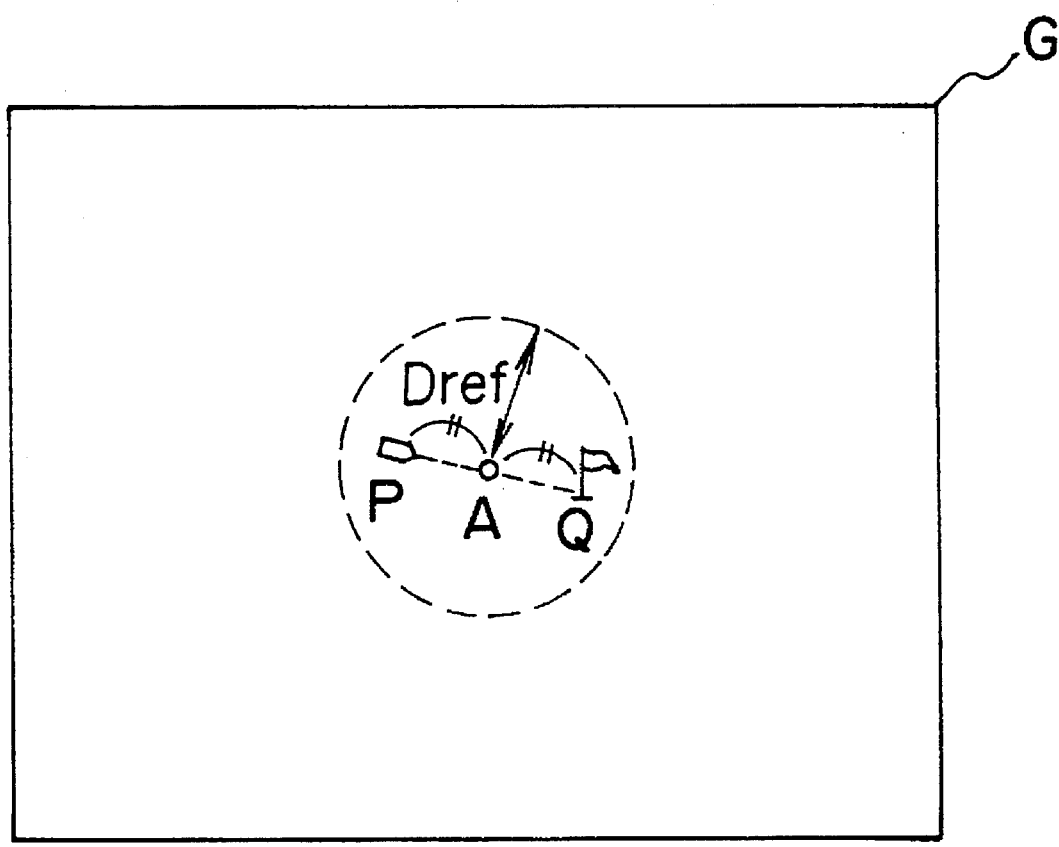
FIG. 3 is a diagram showing one example of an image display in the embodiment.
Figure 4B:
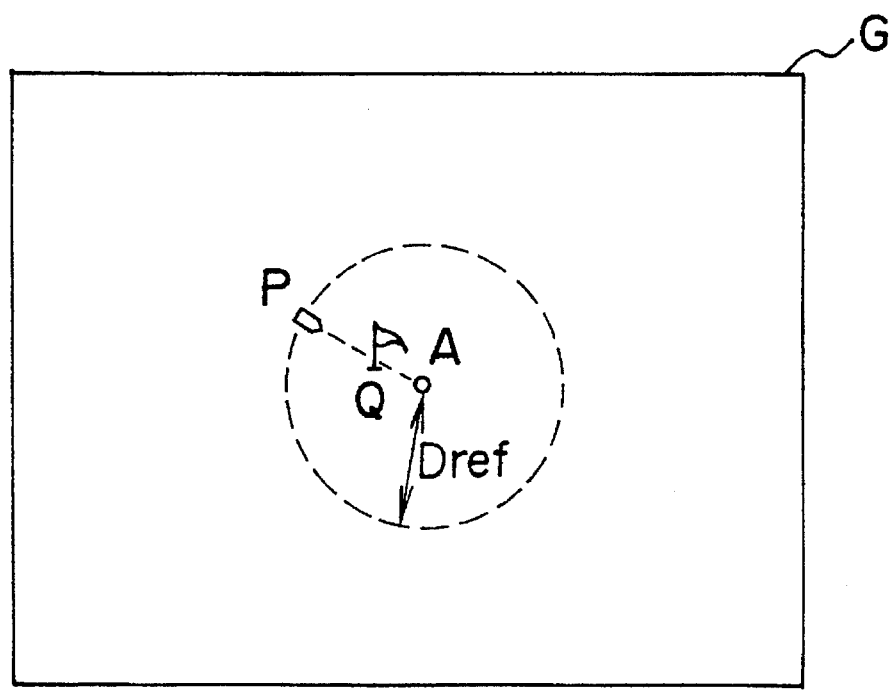
Figure 5:
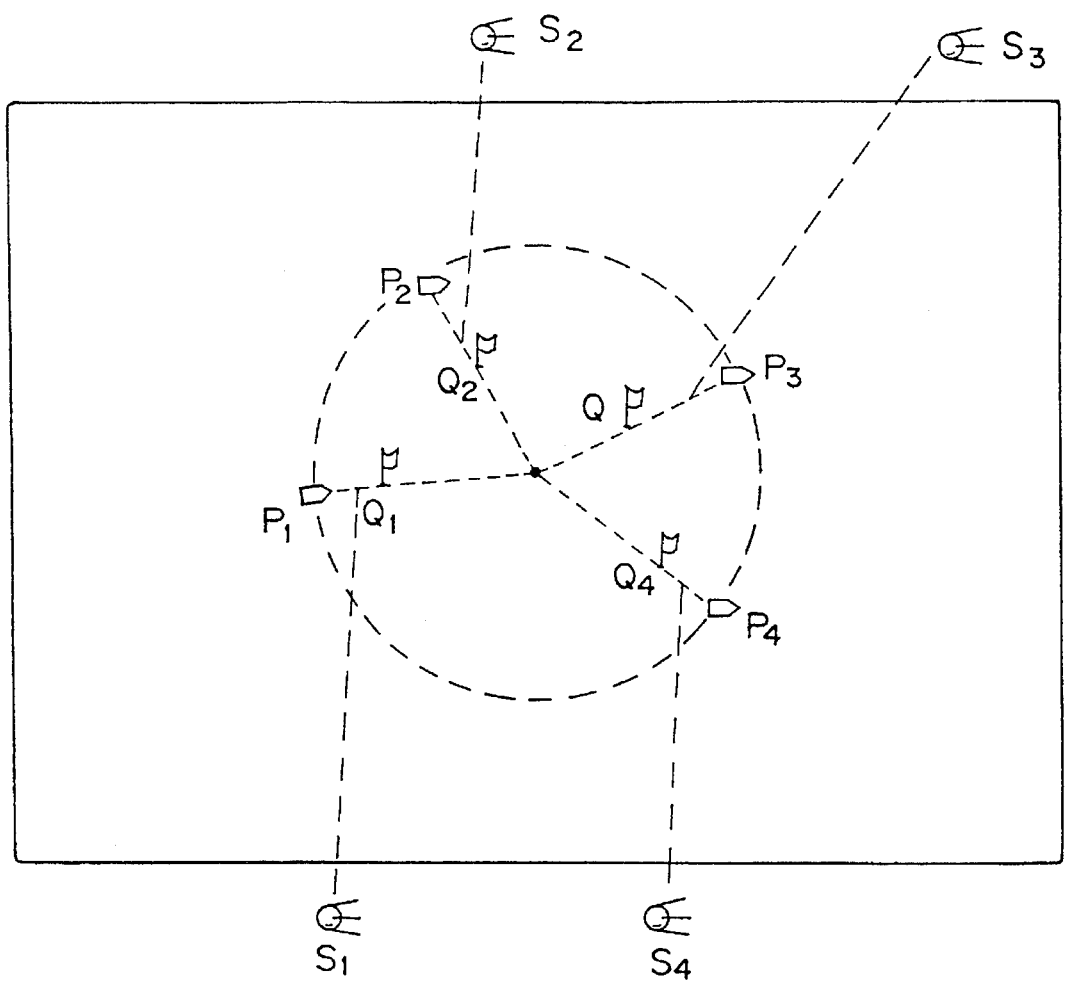
FIG. 5 is a diagram for explaining a blur of the movable body position on the image display in the related art.

This case corresponds to the positional relationship between the position P and the position Q shown in FIG. 4B, i.e. when the position Q comes into the area prescribed by the radius of the distance Dref around the position P. In this case, the center position A is calculated according to the center position calculation No. 1 in the step S105. The expression of the center position calculation No. 1 of the step S105, is an expression to obtain an arithmetical average of the position P and the position Q i.e. to obtain the middle position between the position P and the position Q. Namely, the distances from the position A to those positions P and Q are the same to each other, as shown in FIG. 3. This information is stored to the RAM 9.

Finally, from the information of the coordinate $A(x,y)$ of the position A, which is calculated and stored in each case, the CPU 7 outputs the control signal to the CD-ROM drive 12, and reads out the map information related to the case where the center is at the coordinate A (x, y), from the CD-ROM disk DK. By outputting this information to the graphic controller 14, the image display which has a center at the position A, is enabled on the display device 17.

As described above in detail, according to the present embodiment, when the movable body position is distant from the target position, the movable body position is displayed at a position apart from the center position of the display picture plane by a predetermined distance, so that the display can be performed with a good balance according to the aforementioned front wide concept.

Further, when the movable body position approaches the target position, the movable body position and the target position are displayed such that those two position are displayed symmetrically with respect to the center position of the display picture plane, so that the balance on the sight is drastically improved.

Further more, the center position is set at the middle position between the movable body position, which has a possibility to move frequently due to the measurement error, and the target position, which is a fixed position. Thus, the blurring phenomenon in the display of the movable body position, which is caused by exchanging the GPS satellites because of the degradation of the receiving condition of the GPS satellite, is reduced in the movement amount on the display picture plane, so that the blurring is not outstanding compared with the conventional cases, according to the present embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation apparatus comprising:

a measuring means for measuring a present position of a movable body to output a present position information indicating the measured present position;

a storing means for storing map information;

a displaying means having a display picture plane, for displaying various information on the display picture plane;

a display controlling means for controlling said displaying means to display a target position information, which is set as information indicating a target position, and the present position information on the map information;

a judging means for judging whether a distance between the present position and the target position is within a predetermined value; and a calculating means for calculating a middle position between the present position and the target position when the judged distance is within the predetermined value according to a judgement by the judging means, to output middle position information indicating the calculated middle position;

said display controlling means controlling said displaying means to display the target position information and the present position information under a condition where a display position of the middle position information is located at a center of the display picture plane when the judged distance is within the predetermined value according to the judgement by the judging means, and to display the target position information and the present position information under a condition where a display position of the present position information is away from the center of the display picture plane by a predetermined distance when the judged distance is not within the predetermined value according to the judgement by the judging means.

2. A navigation apparatus according to claim 1, wherein said measuring means comprises at least one of an earth magnetism sensor, an angular velocity sensor, a travelling distance sensor and a GPS (Global Positioning System) receiver.

3. A navigation apparatus according to claim 1, further comprising an inputting means for inputting the target position.

4. A navigation method comprising the steps of:

measuring a present position of a movable body to output a present position information indicating the measured present position;

storing map information;

displaying various information on a display picture plane of a displaying means;

controlling said displaying means to display a target position information, which is set as information indicating a target position, and the present position information on the map information;

judging whether a distance between the present position and the target position is within a predetermined value;

calculating a middle position between the present position and the target position when the judged distance is judged to be within the predetermined value, to output middle position information indicating the calculated middle position; and controlling said displaying means to display the target position information and the present position information under a condition where a display position of the middle position information is located at a center of the display picture plane when the judged distance is within the predetermined value according to a judgement of the judging step, and to display the target position information and the present position information under a condition where a display position of the present position information is away from the center of the display picture plane by a predetermined distance when the judged distance is not within the predetermined value according to the judgement of the judging step.

5. A navigation method according to claim 4, further comprising the step of inputting the target position by an inputting means.

6. A navigation method according to claim 4, wherein, in said measuring step, the present position is measured by at least one of an earth magnetism sensor, an angular velocity sensor, a travelling distance sensor and a GPS (Global Positioning System) receiver.

* * * * *